US005748998A

United States Patent [19]
Ishiguro et al.

[11] Patent Number: 5,748,998
[45] Date of Patent: May 5, 1998

[54] CAMERA

[75] Inventors: Minoru Ishiguro; Jun'ichi Iwamoto, both of Saitama-ken, Japan

[73] Assignee: Fuji Photo Optical Co., Ltd., Saitana-ken, Japan

[21] Appl. No.: 865,345

[22] Filed: May 30, 1997

Related U.S. Application Data

[62] Division of Ser. No. 536,943, Sep. 29, 1995, Pat. No. 5,701,520.

[30] Foreign Application Priority Data

Oct. 13, 1994 [JP] Japan .................................. 6-247866
Oct. 13, 1994 [JP] Japan .................................. 6-247877

[51] Int. Cl.$^6$ .......................... G03B 5/00; G03B 17/18
[52] U.S. Cl. .......................... 396/88; 396/292; 396/137; 396/147
[58] Field of Search ........................ 396/88, 292, 137, 396/147

[56] References Cited

U.S. PATENT DOCUMENTS

| | | | |
|---|---|---|---|
| 4,312,581 | 1/1982 | Miyagawa et al. | 354/106 |
| 4,423,938 | 1/1984 | Tominaga | 354/106 |
| 4,699,487 | 10/1987 | Kawamura et al. | 354/173.1 |
| 4,945,373 | 7/1990 | Hashimoto | 354/217 |
| 4,984,001 | 1/1991 | Himuro | 354/195.12 |
| 4,984,005 | 1/1991 | Kazami et al. | 354/412 |
| 5,159,364 | 10/1992 | Yanagisawa et al. | 354/21 |
| 5,258,805 | 11/1993 | Aoki et al. | 354/475 |
| 5,298,936 | 3/1994 | Akitake et al. | 354/471 |
| 5,363,169 | 11/1994 | Ishida et al. | 354/442 |
| 5,502,830 | 3/1996 | Aihara | 395/421.07 |
| 5,555,064 | 9/1996 | Machida | 354/289.12 |

Primary Examiner—W. B. Perkey
Attorney, Agent, or Firm—Leydig, Voit & Mayer, Ltd.

[57] ABSTRACT

A camera comprising a mode setting portion in which either mode is set out of a first focusing mode and a second focusing mode; a mode switch; detecting means; focusing means; and focusing mode controlling means for performing such a control, after completion of focusing, that when the period detected by the detecting means is longer than a predetermined period and the second focusing mode is set, or when the first focusing mode is set, the mode is held as it is, and that when the period is shorter than the period and the second focusing mode is set, the mode is switched to the first focusing mode. The present invention provides a camera which permits the user to select either the operation in which the mode change is performed every shot or the operation in which a same mode is continuously maintained, by the period in which the mode switch is kept on.

9 Claims, 10 Drawing Sheets

CAMERA

This disclosure is a division of patent application Ser. No. 08/536,943, filed Sep. 29, 1995, now U.S. Pat. No. 5,701,520.

BACKGROUND OF THE INVENTION

1. Field of the Invention

The present invention relates to a camera, and more particularly to a camera provided with an autofocus mechanism (automatic focusing mechanism), which permits a user to designate whether the autofocus mechanism is to be on or off, and a camera having a motorized manual focus mechanism for achieving focus at a distance designated by the user.

2. Related Background Art

Many recent cameras have the autofocus mechanism for automatically adjusting focus. The autofocus methods are roughly classified into the passive method and the active method.

The passive method is one for measuring a distance, using the same principle as the triangulation and utilizing contrast of an object. Namely, because the contrast becomes highest when twin images come into coincidence with each other as in a rangefinder, the lens is moved so as to achieve the highest contrast, thereby achieving focus.

The active method is one for determining a position of the lens by emitting light or sound of a certain wavelength from the camera to the object and obtaining a distance from an angle or a time of the light or sound reflected by the object back to the camera.

As described, the cameras provided with the autofocus mechanism (so-called autofocus cameras) permit a photographer to take photographs without manually attaining focus, thus being very convenient. However, because focusing by the autofocus mechanism is carried out based on measurement of the distance between the camera and the object, it had a problem that distance measurement took a considerable time for taking a photograph of a very far object such as a distant view. Then, solving this problem, there are conventionally developed autofocus cameras provided with an infinity mode (far-field mode) for taking a photograph while fixing focus at infinity, in addition to the autofocus mode. When this type of camera is used to take a photograph in the infinity mode, focus is fixed at infinity without driving the autofocus mechanism, whereby a distant view can be quickly photographed.

The conventional autofocus cameras provided with the infinity mode, however, are normally constructed in such an arrangement that they operate in the autofocus mode unless the infinity mode is designated and that even if they are turned once into the infinity mode, they always return to the original autofocus mode as soon as a shutter release button is depressed. Thus, they had a problem that for continuously taking a plurality of photographs in the infinity mode, mode setting must be repeated every after shooting.

Meanwhile, focusing by the autofocus mechanism requires that the object is always located at the center of screen. It was thus difficult to achieve correct focus by the autofocus mechanism in cases of taking photographs of an object moving at high speed and in cases of taking photographs of an object located near an edge of screen. Then, there are commercially available cameras having a manual focus mechanism for permitting the photographer to manually attain focus in cases of taking photographs of such special objects. In focusing by such a manual focus mechanism, the user manipulates a focus dial (focal length setting dial) provided in the upper part or the like of camera. Numerals indicating distances are written on the surface of the focus dial, and the user designates a focal length by rotating the focus dial while referring to the numerals. When the shutter release button is depressed, the motorized focus mechanism is driven to achieve focus on an object located apart at the distance.

It was, however, difficult for the user to designate a focal length as looking at the numerals on the focus dial while holding the camera in position. Thus, the user needed to change the holding state of camera once for manipulating the focus dial.

SUMMARY OF THE INVENTION

An object of the present invention is to provide a camera having an interface excellent in operability of changeover between the autofocus mode and another focusing mode, for example such as the infinity mode.

Another object of the present invention is to provide a camera having an interface excellent in operability, particularly upon shooting with manual setting of a focal length.

The present invention provides a camera comprising:

(a) a mode setting portion in which either mode is set out of a first focusing mode and a second focusing mode;

(b) a mode switch (for example, a switch having a push button) capable of being switched between an off state and an on state, the mode switch alternately switching a mode set in the mode setting portion between the first focusing mode and the second focusing mode every activation of the on state;

(c) detecting means for detecting a period in which the mode switch is kept in the on state;

(d) focusing means for performing focusing according to the mode set in the mode setting portion in synchronization with a shutter release button; and (e) focusing mode controlling means for performing such a control, after completion of the focusing by the focusing means, that when the period detected by the detecting means is longer than a predetermined period and when the mode set in the mode setting portion is the second focusing mode, the mode set in the mode setting portion is held in the second focusing mode, that when the period detected by the detecting means is shorter than the predetermined period and when the mode set in the mode setting portion is the second focusing mode, the mode set in the mode setting portion is switched from the second focusing mode to the first focusing mode, and that when the mode set in the mode setting portion is the first focusing mode, the mode set in the mode setting portion is held in the first focusing mode.

The first focusing mode is preferably an autofocus mode in which the focusing means performs focusing to achieve focus according to a distance between the camera and an object. Further, the second focusing mode is preferably either a fixed focus mode in which the focusing means achieves focus at a specific focal length or a manual focus mode in which the focusing means achieves focus at a focal length manually designated.

In the above camera of the present invention, when the user turns the mode switch into the on state while the mode set in the mode setting potion is kept in the first focusing mode (for example, in the autofocus mode), the mode set in the mode setting portion is switched from the first focusing mode to the second focusing mode (for example, to the fixed focus mode or the manual focus mode). The detecting means detects the period in which the mode switch is kept in the on state.

If the period detected by the detecting means is shorter than the predetermined period, the focusing mode controlling means again sets the first focusing mode in the mode setting portion after completion of the focusing by the focusing means. On the other hand, if the period detected by the detecting means is longer than the predetermined period, the mode set in the mode setting portion is held in the second focusing mode even after completion of the focusing by the focusing means. Further, if the mode is switched from the second focusing mode to the first focusing mode, the mode set in the mode setting portion is also held in the first focusing mode after completion of the focusing by the focusing means, regardless of the period detected by the detecting means.

Thus, if the mode is switched from the first focusing mode to the second focusing mode by turning on the mode switch for a period shorter than the predetermined period, the mode returns to the original first focusing mode after the shutter button is pressed once.

In contrast with it, if the mode is switched from the first focusing mode to the second focusing mode by keeping the mode switch in the on state for a period not less than the predetermined period, the mode is always held in the second focusing mode, irrespective of how many times the shutter release button is pressed, before the mode switch is next turned into the on state.

Further, the present invention provides a camera comprising:
  (a) a mode setting portion in which either mode is set out of a first focusing mode, a second focusing mode, and a third focusing mode;
  (b) a mode switch (for example, a switch having a push button) capable of being switched between an off state and an on state, the mode switch successively switching a mode set in the mode setting portion among the first focusing mode, the second focusing mode, and the third focusing mode every activation of the on state;
  (c) detecting means for detecting a period in which the mode switch is kept in the on state;
  (d) focusing means for performing focusing according to the mode set in the mode setting portion in synchronization with a shutter release button; and
  (e) focusing mode controlling means for performing such a control, after completion of the focusing by the focusing means,
  that when the period detected by the detecting means is longer than a predetermined period and when the mode set in the mode setting portion is either the second focusing mode or the third focusing mode, the mode set in the mode setting portion is held as it is,
  that when the period detected by the detecting means is shorter than the predetermined period and when the mode set in the mode setting portion is either the second focusing mode or the third focusing mode, the mode set in the mode setting portion is switched to the first focusing mode, and
  that when the mode set in the mode setting portion is the first focusing mode, the mode set in the mode setting portion is held in the first focusing mode.

The first focusing mode is preferably the autofocus mode in which the focusing means achieves focus according to the distance between the camera and the object. Also, the second focusing mode is preferably the fixed focus mode in which the focusing means achieves focus at a specific focal length. Further, the third focusing mode is preferably the manual focus mode in which the focusing means achieves focus at a focal length manually designated.

In the above camera of the present invention, when the user turns the mode switch into the on state once or twice while the mode set in the mode setting portion is kept in the first focusing mode (for example, the autofocus mode), the mode set in the mode setting portion is switched from the first focusing mode into the second focusing mode (for example, the fixed focus mode) or the third focusing mode (for example, the manual focus mode). The detecting means detects the period in which the mode switch is kept in the on state.

If the period detected by the detecting means is shorter than the predetermined period, the focusing mode controlling means again sets the first focusing mode in the mode setting portion after completion of the focusing by the focusing means. On the other hand, if the period detected by the detecting means is longer than the predetermined period, the mode set in the mode setting portion is maintained as it is even after completion of the focusing by the focusing means. Further, if the mode is switched from either the second or third focusing mode to the first focusing mode, the mode set in the mode setting portion is also held in the first focusing mode, regardless of the period detected by the detecting means, after completion of the focusing by the focusing means.

Thus, if the mode is switched from the first focusing mode to the second focusing mode or the third focusing mode by keeping the mode switch in the on state for the period shorter than the predetermined period, the mode is returned to the original first focusing mode after the shutter release button is pressed once.

In contrast with it, if the mode is switched from the first focusing mode to the second focusing mode or the third focusing mode by keeping the mode switch in the on state for the period not less than the predetermined period, the focusing mode set is always held as it is, independently of how many times the shutter release button is pressed, before the mode switch is next turned into the on state.

Further, the present invention provides a camera comprising:
  focal length designating means capable of being switched between an off state and an on state, the focal length designating means accepting designation of a focal length in the on state and outputting data concerning the focal length;
  a clock circuit for outputting data concerning a time;
  a display for displaying either data out of the data concerning the focal length and the data concerning the time;
  focusing means for performing focusing to achieve focus at a focal length designated through the focal length designating means in synchronization with a shutter release button; and
  display controlling means for displaying the data concerning the focal length on the display when the focal length designating means is kept in the on state and displaying the data concerning the time on the display when the focal length designating means is kept in the off state.

In a preferred embodiment, the focal length designating means comprises a storing portion for storing a plurality of focal length data, and focal length data controlling means for successively outputting data concerning the focal length by successively reading the focal length data at predetermined time intervals out of the plurality of focal length data stored in the storing portion while the focal length designating means is kept in the on state. the focal length data controlling means accepting, as a focal length designated, focal length data read out when the focal length designating means is switched from the on state to the off state. In this case. if the focal length designating means is kept in the on state, the display controlling means successively displays the data concerning the focal length output from the focal length designating means, on the display.

In an embodiment of the above camera of the present invention, the display comprises first and second segments for displaying respective numerals, and a third segment disposed between the first segment and the second segment, the third segment being provided for displaying either one of a colon and a period;

wherein when the focal length designating means is kept in the on state, the display controlling means displays the data concerning the focal length in the first, second, and third segments and wherein when the focal length designating means is kept in the off state, the display controlling means displays the data concerning the time in at least the first and second segments.

Another embodiment of the above camera of the present invention further comprises a switch for alternately switching the data concerning the time between data of a date and data of a real time;

wherein the display controlling means controls the display in such a manner that for displaying the data concerning the focal length, the first, second, and third segments display the data and the third segment displays a period, that for displaying the data of the real time, the first, second, and third segments display the data and the third segment displays a colon, and that for displaying the data of the date, at least the first and second segments display the data.

According to the above camera of the present invention, when the user designates a focal length, the focal length designating means receives the focal length designated. The data concerning the focal length thus received is displayed on the display by the display controlling means while the focal length designating means is kept in the on state, whereby the user can visually recognize that the focal length is correctly accepted. When the user depresses the shutter release button after confirming that the focal length accepted is correct, the focusing means automatically achieves focus at the focal length.

Here, if the focal length designating means comprises the above storing portion and the focal length data controlling means and when the user turns the focal length designating means into the on state, the distance data is successively read at predetermined time intervals out of a plurality of focal length data stored in the storing portion. The distance data thus read out is successively displayed on the display by the display controlling means. When the user observing the display switches the focal length designating means into the off state after desired focal length data is displayed on the display, reading-out of the focal length data is suspended, and focal length data read out at that time is accepted as a focal length designated. The finally read-out focal length data is continuously displayed on the display. After that, when the user depresses the shutter release button, the focusing means achieves focus at the focal length designated (which is a distance indicated by the focal length data finally read out).

Further, the above camera of the present invention is arranged to display the data concerning the focal length on the display which is arranged normally to display the data concerning the time, thereby enabling to display the data concerning the focal length without using a separate display (segments).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
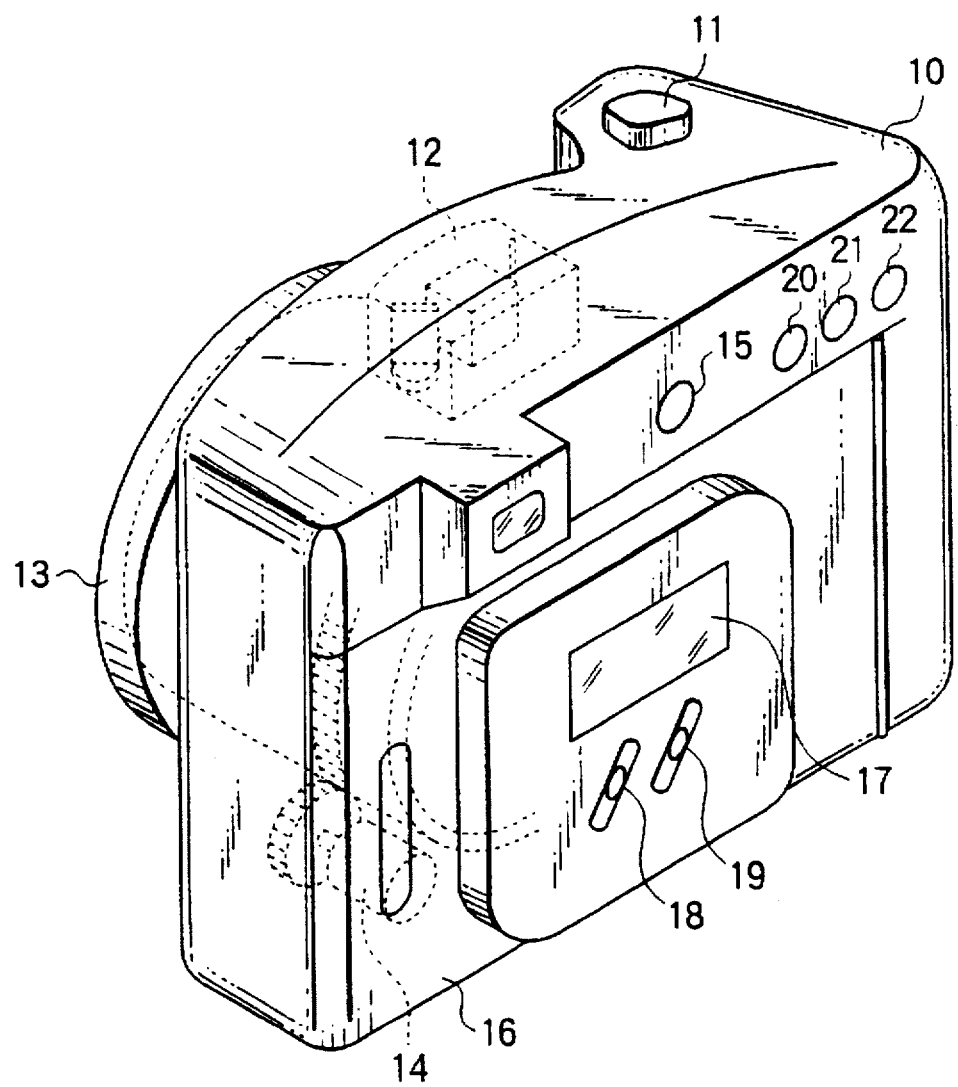
FIG. 1 is a perspective view to show the appearance of an example of an autofocus camera according to the present invention.

An embodiment of the present invention will be explained by reference to the accompanying drawings. FIG. 1 is a perspective view to show the appearance of an autofocus camera according to the present embodiment. Referring to FIG. 1, the autofocus camera of the present embodiment has a shutter release button 11 disposed on the top surface of a rectangular parallelepiped body 10, and a distance-measuring device 12 for measuring a distance between the camera and an object is incorporated in the top part of the front surface of body 10. This distance-measuring device 12 employs the passive method for obtaining the distance to the object by emitting light to the object and measuring a contrast of reflected light from the object. A lens barrel 13 in which lenses are incorporated is mounted in the central portion of the front surface of body 10. The lens barrel 13 has a double-barrel structure, which is arranged to expand or contract an inner barrel by driving a built-in motor 14. This expansion or contraction changes the distance between the film and the lens set in the inner barrel, thereby achieving focus at a desired distance.

Further, there are a power-supply switch 15 disposed in the center of the upper part of the back face of body 10 and a liquid crystal display 17 disposed on a back lid 16 in the back face of body 10. This liquid crystal display 17 indicates by the segment type display method data concerning the time (for example, data of a date such as "year-month-day", "month-day-year", or "day-month-year", or data of a real time such as "month-day-hour", "day-hour-minute", or "hour-minute-second") or data concerning the focal length. A mode switch 18 and a focal length switch (focal length designating means) 19 are horizontally arranged below the liquid crystal display 17, and switches 20–22 are horizontally arranged in the upper part of the back face of body 10. The mode switch 18 is a push button switch for selecting either mode out of an autofocus mode, a fixed focus mode, and a manual focus mode, and is arranged to successively change the selected mode every time the push button is forced down (into an on state). Also, the focal length switch 19 is a push button switch for the user to manually designate a desired focal length in the manual focus mode, and is arranged to successively change focal length data designated every time the push button is forced down (into an on state), to be displayed on the liquid crystal display 17.

Here, the autofocus mode is a mode in which the distance-measuring device 12 measures the distance from the camera to the object and focus is achieved at this distance. The fixed focus mode is a mode in which focus is fixed at infinity. Further, the manual focus mode is a mode in which focus is achieved at a focal length designated by the user.

The present embodiment is arranged to detect the period during which the push button of the mode switch 18 is forced down when the selected mode is changed from the autofocus mode to the fixed focus mode or from the autofocus mode to the manual focus mode, using the mode switch 18. If this period is shorter than a predetermined period (for example, three seconds), single-shot shooting is allowed in the changed mode (either the fixed focus mode or the manual focus mode) and thereafter the mode is returned to the autofocus mode. If the period detected is not less than the predetermined period (for example, three seconds), the changed mode (either the fixed focus mode or the manual focus mode) is held before the mode switch 18 is next forced down.

Figure 2:
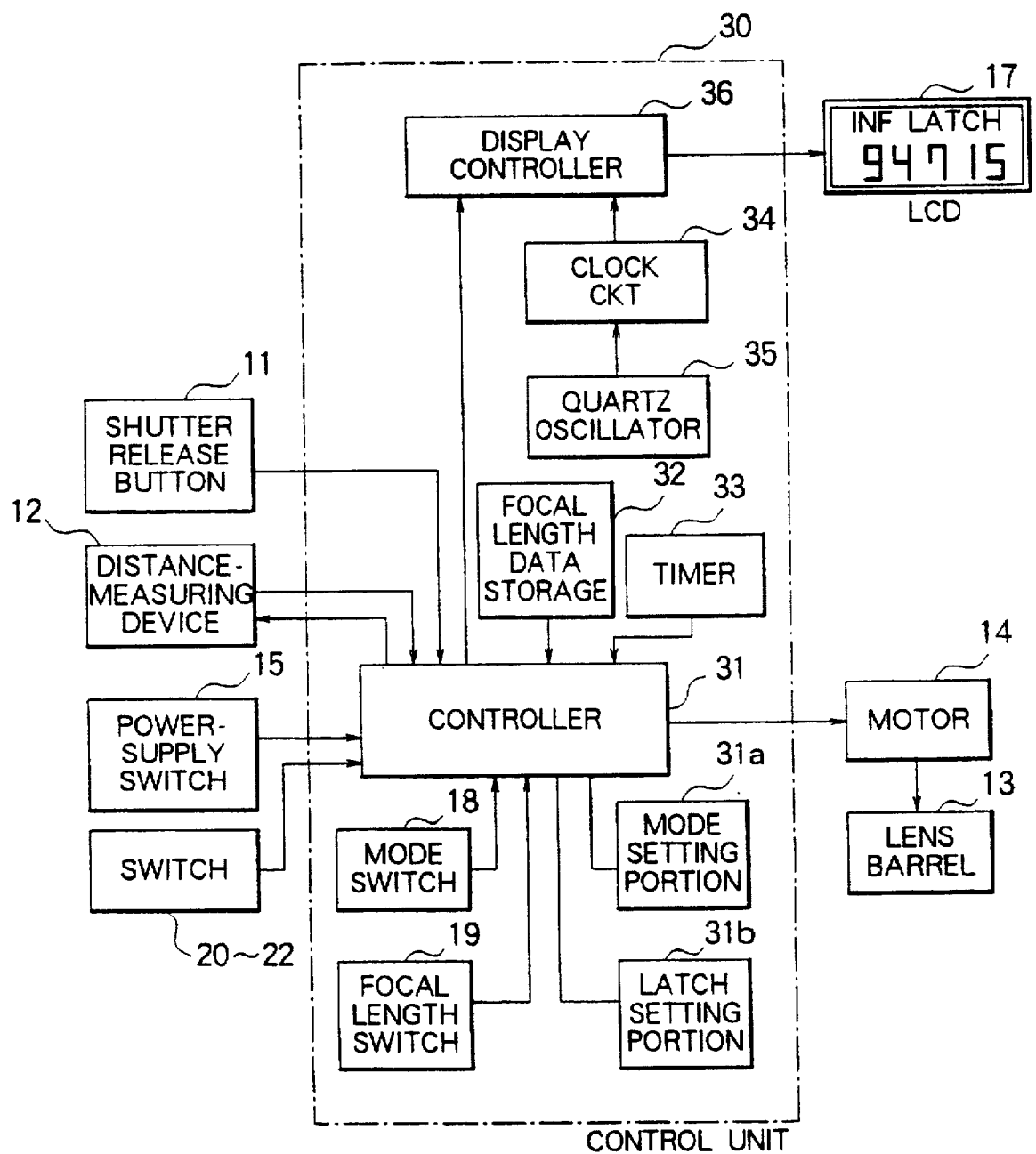
FIG. 2 is a block diagram to show the structure of an example of a control unit according to the present invention.

For performing such processing, the autofocus camera of the present embodiment includes a control unit 30 shown in the block diagram of FIG. 2.

In FIG. 2, the control unit 30 is provided with a control portion (focus mode controlling means) 31, which is a detecting means for detecting the period during which the push button of the mode switch 18 is forced down and which changes the mode set in the mode setting portion into the autofocus mode if the period detected is shorter than the predetermined period (for example, three seconds) and if the mode set is either the fixed focus mode or the manual focus mode. The control portion 31 has a mode setting portion 31a and a latch setting portion 31b, and either one mode is set in the mode setting portion 31a out of the "autofocus mode", the "fixed focus mode", and the "manual focus mode". Either "latch on" or "latch off" is set in the latch setting portion 31b.

"Latch on" is set if the period during which the push button of the mode switch 18 is forced down is not less than the predetermined period (for example, three seconds), whereas "latch off" is set if the period during which the push button of the mode switch 18 is forced down is less than the predetermined period (for example, three seconds). If "latch on" is set in the latch setting portion 31b, the same mode is maintained after the shutter release button 11 is depressed in either the fixed focus mode or the manual focus mode. In contrast with it, if "latch off" is set in the latch setting portion 31b, the mode is changed over into the autofocus mode after the shutter release button 11 is depressed in either the fixed focus mode or the manual focus mode.

The control unit 30 has a focal length storing portion 32 for storing data of a plurality of different focal lengths, such as 0.3 m, 0.4 m, 0.5 m, 0.6 m, 0.7 m, 0.8 m, 0.9 m, 1.0 m, 1.2 m, 1.5 m, 2.0 m, 2.5 m, 3.0 m, 5.0 m, 10.0 m, 30.0 m, and ∞, and a timer 33 for measuring a period during which the push button of the mode switch 18 or the focal length switch 19 is forced down. The focal length data stored in the focal length storing portion 32 have respective reading ranks different from each other, and are read out in order according to the reading ranks by the control portion (focal length data controlling means) 31 while the push button of the focal length switch 19 is forced down.

Further, the control unit 30 has a clock circuit 34 and a quartz oscillator 35. Pulse signals output from the quartz oscillator 35 are input into the clock circuit 34, and the clock circuit 34 counts an accurate time, based on the pulse signals, and outputs data concerning the time.

Furthermore, the control unit 30 has a display control portion 36, and the display control portion 36 receives the data concerning the time counted by the clock circuit 34 and the data concerning the focal length read out from the focal length storing portion 32. The display control portion 36 causes the liquid crystal display 17 to indicate the data concerning the time or the focus, based on these data.

The control unit 30 receives a signal from the shutter release button 11, the focal length data from the distance-measuring device 12, and a making signal from the power-supply switch 15. Receiving the signal from the shutter release button 11, the control unit 30 supplies a control signal to the motor 14 in accordance with the mode set in the mode setting portion 31a.

The details of the processing by the control unit 30 are next explained using the flowcharts in FIG. 3 to FIG. 7 and the drawings of examples of screen indications in FIG. 8A–FIG. 8E and FIG. 9A–FIG. 9E.

Figure 3:
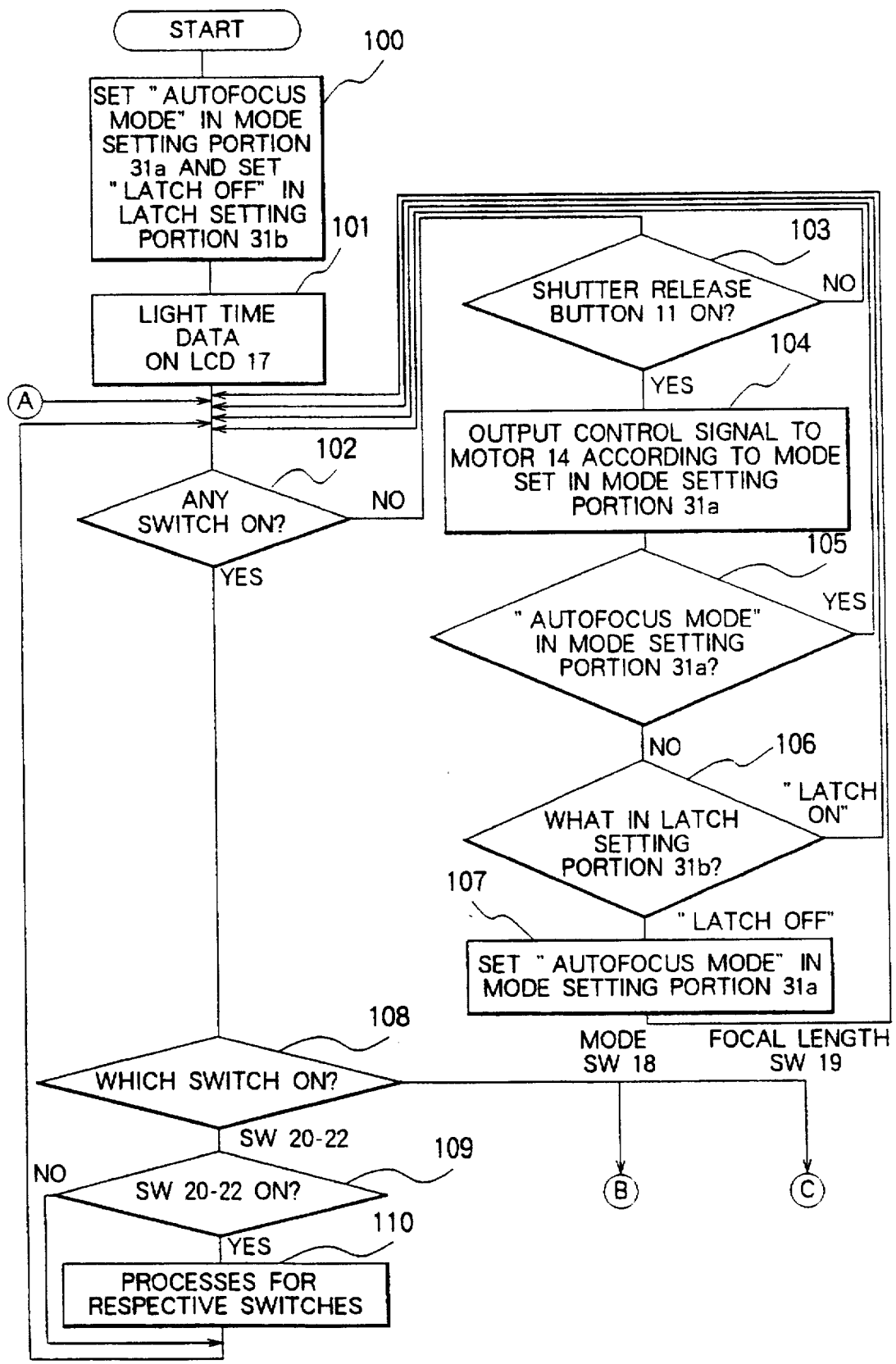
FIG. 3 is a flowchart to show the details of an example of processing by the control unit according to the present invention.
Figure 8A:
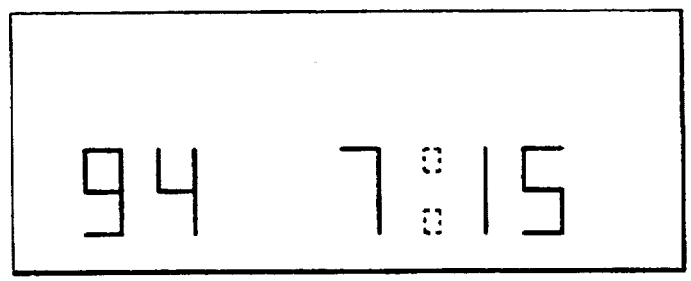
FIG. 8A to FIG. 8E are each drawings to show examples of screen display on a liquid crystal display according to the present invention.

This processing is started when the user turns on the power-supply switch 15. As shown in FIG. 3, receiving a making signal of the power-supply switch 15, the control portion 31 sets the "autofocus mode" in the mode setting portion 31a and "latch off" in the latch setting portion 31b (step 100). Next, the display control portion 36 sends a control signal to the liquid crystal display 17 so that the liquid crystal display 17 is turned on to display a numeral sequence indicating the data concerning the time counted by the clock circuit 34 (step 101). Based on this control signal, the liquid crystal display 17 displays the image as shown in FIG. 8A. Then it is checked whether either one is pressed out of the mode switch 18, the focal length switch 19, and the switches 20–22 (step 102), and in case of neither switch being pressed, whether the shutter release button 11 is depressed is checked (step 103).

When the shutter release button 11 is depressed, the control unit 30 sends a control signal to the motor 14, based on the data set in the mode setting portion 31a (step 104). Specifically, if the "autofocus mode" is set in the mode setting portion 31a, the control unit 30 sends to the motor 14 a control signal for expanding or contracting the lens barrel 13 so that focus is attained at the distance indicated by the focal length data input from the distance-measuring device 12. If the "fixed focus mode" is set in the mode setting portion 31a, the control unit 30 sends to the motor 14 a control signal for expanding or contracting the lens barrel 13 so as to achieve focus at infinity. Further, if the "manual focus mode" is set in the mode setting portion 31a, the control unit 30 sends to the motor 14 a control signal for expanding or contracting the lens barrel 13 so as to achieve focus at a focal length selected by the user using the focal length switch 19.

It is next checked whether the "autofocus mode" is set in the mode setting portion 31a (step 105), and unless the "autofocus mode" is set, what is set in the latch setting portion 31b is then checked (step 106). If "latch off" is set in the latch setting portion 31b, the "autofocus mode" is set in the mode setting portion 31a (step 107) to return the processing to step 102. The processing is also returned to step 102 if the shutter release button 11 is not depressed at step 103, if the "autofocus mode" is set in the mode setting portion 31a at step 105, and if "latch on" is set in the latch setting portion 31b at step 106.

If either switch is depressed at step 102, the control unit 30 checks which switch is depressed (step 108). If either the mode switch 18 or the focal length switch 19 is pressed, associated processing as detailed later will be performed. If either switch 20–22 is depressed, it is checked whether the switch is now on (step 109), and if it is on processing associated with the switch is executed (step 110). The processing is returned to step 102 if the switch is already turned off at step 109 or if the processing of step 110 is finished.

Figure 4:
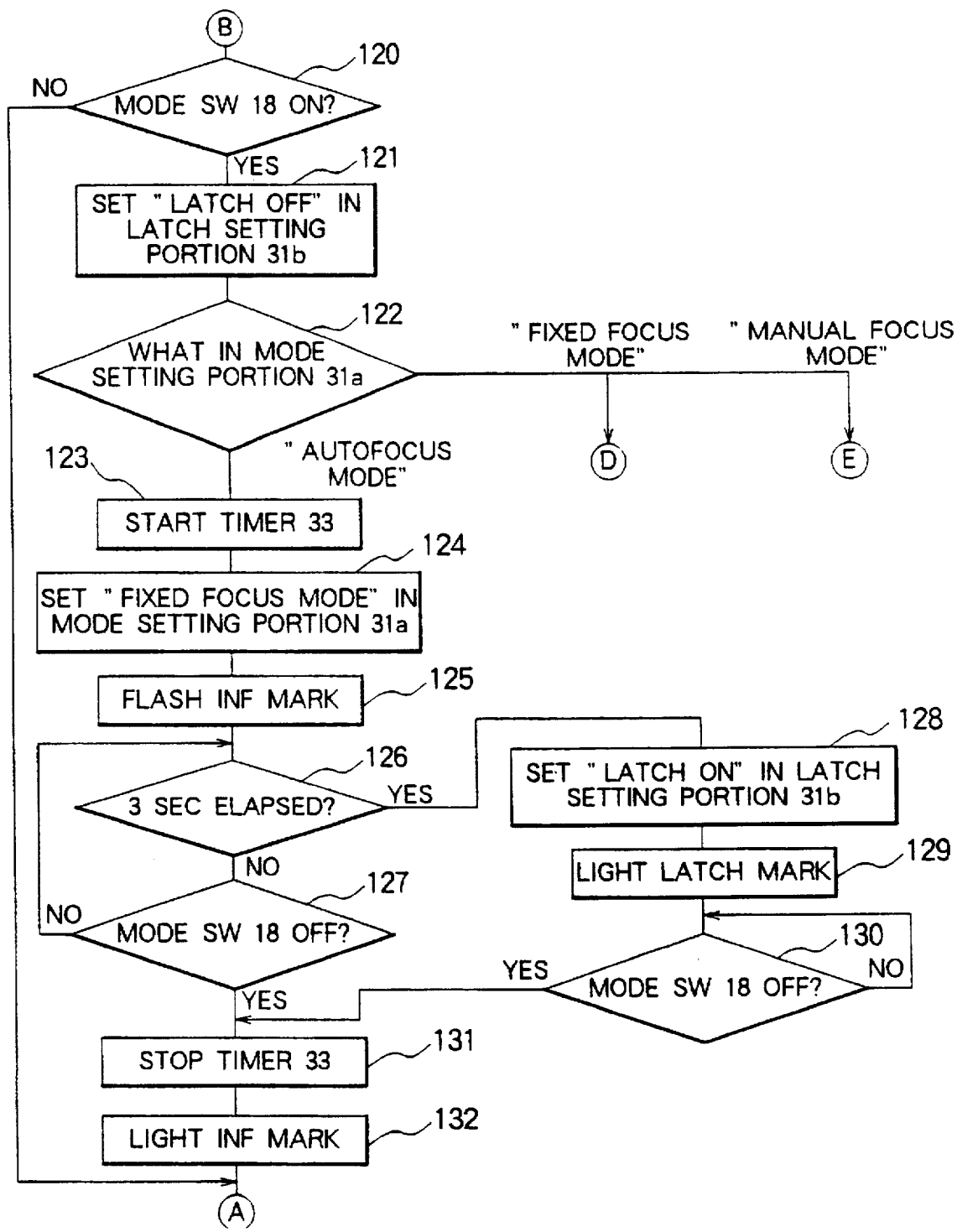
FIG. 4 is a flowchart to show the details of the example of processing by the control unit according to the present invention.

Next explained referring to FIG. 4 is the processing executed when the mode switch 18 is pressed at step 108.

Figure 8B:
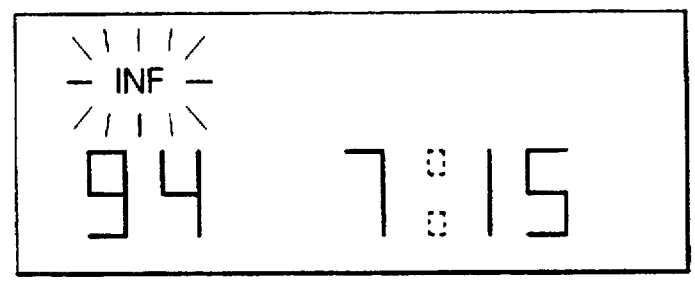

In FIG. 4, it is first checked whether the mode switch 18 is on (step 120). If the mode switch 18 is on, "latch off" is set in the latch setting portion 31b (step 121). Then, what is set in the mode setting portion 31a is checked (step 122), and if the "autofocus mode" is set, the timer 33 is started (step 123). Further, the "fixed focus mode" is set in the mode setting portion 31a (step 124) and the display control portion 36 sends a control signal to the liquid crystal display 17 so as to flash an "INF" mark on the upper left part of the liquid crystal display 17 (step 125). Based on this control signal, the image as shown in FIG. 8B is displayed on the liquid crystal display 17.

Figure 8C:
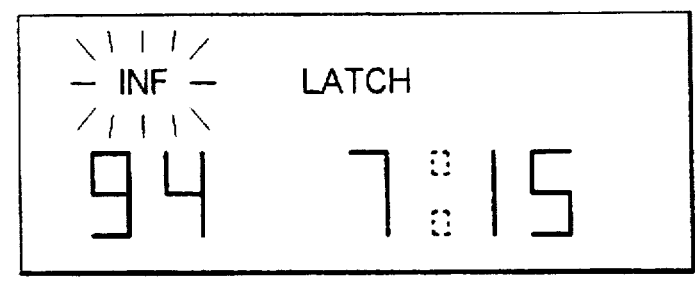

While indicating such a display, it is checked with the timer 33 whether the predetermined time (for example, three seconds) has elapsed after the mode switch 18 was pressed (steps 126, 127). If the mode switch 18 is still on at a lapse of the predetermined time, "latch on" is set in the latch setting portion 31b (step 128). Then the display control portion 36 sends a control signal to the liquid crystal display 17 so as to light to display a "LATCH" mark on the upper right part of the liquid crystal display 17 (step 129). Based on this control signal, the image as shown in FIG. 8C is displayed on the liquid crystal display 17.

Figure 8D:
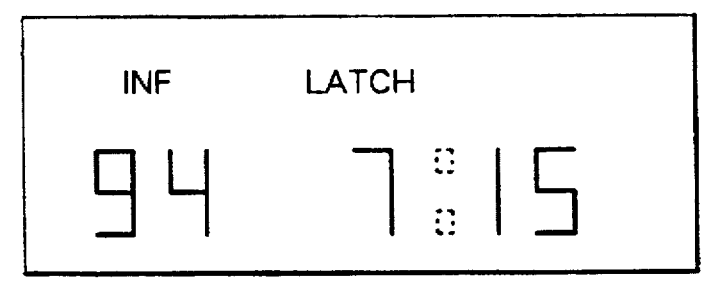

If the mode switch 18 is turned off after completion of the processing of step 129 (step 130), the timer 33 is stopped (step 131). Then the display control portion 36 sends a control signal to the liquid crystal display 17 so as to light to display the "INF" mark on the upper left part of the liquid crystal display 17 (step 132). Based on this control signal, the image as shown in FIG. 8D is displayed on the liquid crystal display 17.

Figure 8E:
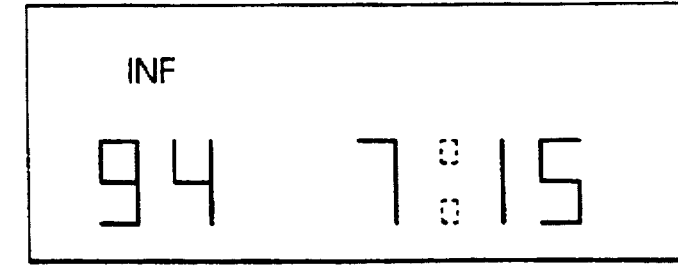

If the mode switch 18 is turned off before the predetermined time (for example, three seconds) has elapsed after the mode switch 18 was pressed (step 127), the timer 33 is also stopped (step 131). Then the display control portion 36 sends a control signal to the liquid crystal display 17 so as to light to display the "INF" mark on the left upper part of the liquid crystal display 17 (step 132). Based on this control signal, the image as shown in FIG. 8E is displayed on the liquid crystal display 17.

Figure 5:
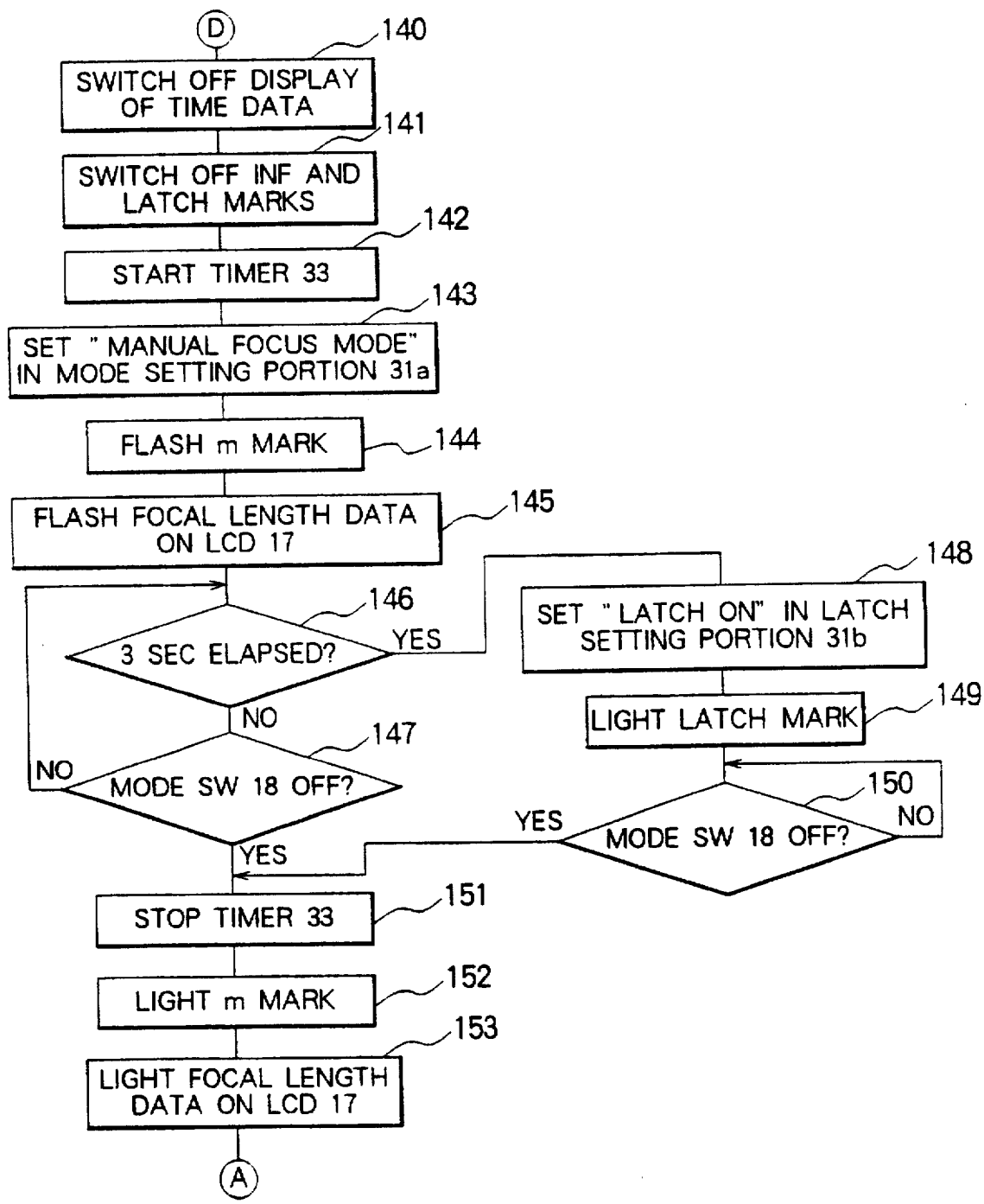
FIG. 5 is a flowchart to show the details of the example of processing by the control unit according to the present invention.

Next explained with FIG. 5 is the processing executed when the "fixed focus mode" is set in the mode setting portion 31a at step 122.

In FIG. 5, first, the display control portion 36 sends a control signal to the liquid crystal display 17 so as to switch off the numeral sequence indicating the data concerning the time, displayed on the liquid crystal display 17 (step 140). Further, the display control portion 36 sends a control signal to the liquid crystal display 17 so as to switch off the "INF" mark and the "LATCH" mark displayed on the liquid crystal display 17 (step 141). Then the timer 33 is started (step 142), and the "manual focus mode" is set in the mode setting portion 31a (step 143).

Figure 9A:
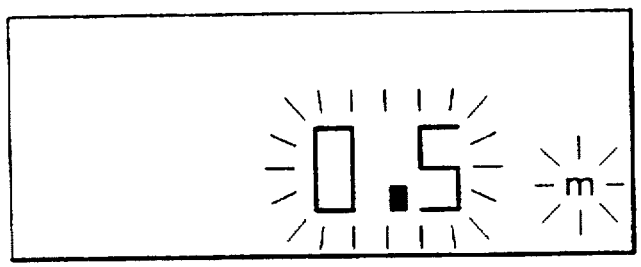
FIG. 9A to FIG. 9E are each drawings to show examples of screen display on the liquid crystal display according to the present invention.

Next, the display control portion 36 sends a control signal to the liquid crystal display 17 so as to flash an "m" mark on the lower right part of the liquid crystal display 17 (step 144). Further, the focal length data with the smallest reading rank is read out of the plurality of focal length data stored in the portion 32, and the display control portion 36 sends a control signal to the liquid crystal display 17 so as to display it on the central portion of the liquid crystal display 17 (step 145). Based on these control signals, the image as shown in FIG. 9A is displayed on the liquid crystal display 17.

Figure 9B:
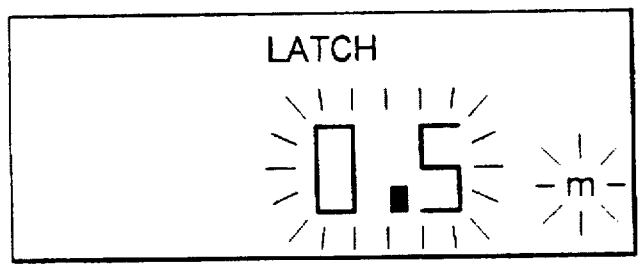

While indicating such a display, it is checked with the timer 33 if the predetermined time (for example, three seconds) has elapsed after the mode switch 18 was pressed (steps 146, 147). If the mode switch 18 is still on at a lapse of the predetermined time, "latch on" is set in the latch setting portion 31b (step 148). Then the display control portion 36 sends a control signal to the liquid crystal display 17 so as to light to display the "LATCH" mark on the upper right portion of the liquid crystal display 17 (step 149). Based on this control signal, the image as shown in FIG. 9B is displayed on the liquid crystal display 17.

Figure 9C:
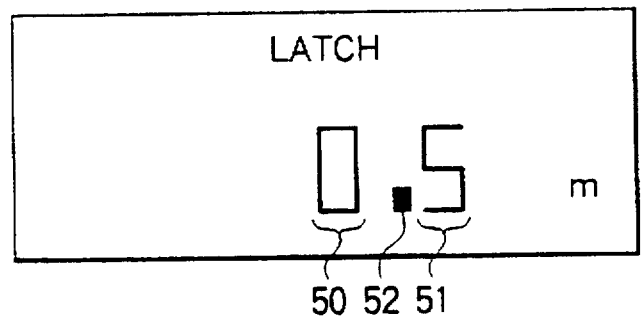

If the mode switch 18 is turned off after completion of the processing of step 149 (step 150), the timer 33 is stopped (step 151). Then the display control portion 36 sends a control signal to the liquid crystal display 17 so as to light to display the "m" mark on the lower right part of the liquid crystal display 17 (step 152). Further, the display control portion 36 sends a control signal to the liquid crystal display 17 so as to light to display the focal length data read out of the focal length storing portion 32, in the central portion of the liquid crystal display 17 (step 153). Based on these control signals, the image as shown in FIG. 9C is displayed on the liquid crystal display 17.

Figure 9D:
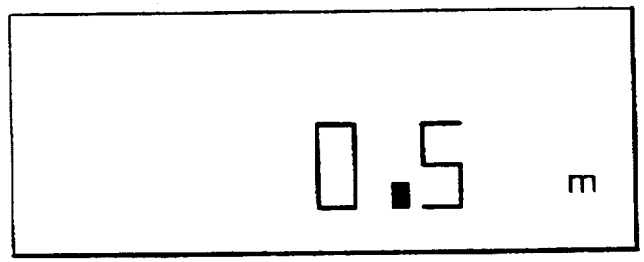

If the mode switch 18 is turned off before the predetermined time (for example, three seconds) has elapsed after the mode switch 18 was pressed (step 147), the timer 33 is also stopped (step 151). Then the display control potion 36 sends a control signal to the liquid crystal display 17 so as to light to display the "m" mark on the lower right part of the liquid crystal display 17 (step 152). Further, the display control portion 36 sends a control signal to the liquid crystal display 17 so as to light to display the focal length data read out of the focal length storing portion 32, in the central portion of the liquid crystal display 17 (step 153). Based on these control signals, the image as shown in FIG. 9D is displayed on the liquid crystal display 17.

Figure 6:
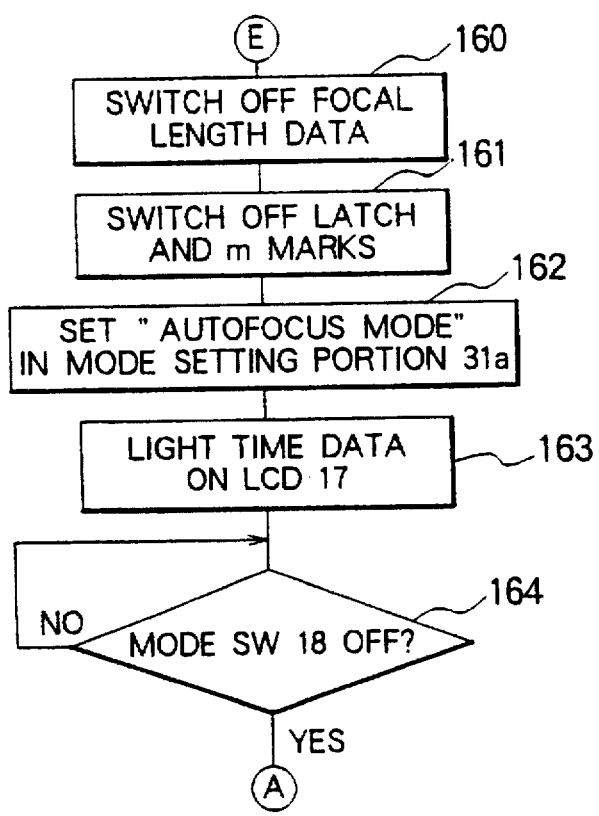
FIG. 6 is a flowchart to show the details of the example of processing by the control unit according to the present invention.

Next explained with FIG. 6 is the processing executed when the "manual focus mode" is set in the mode setting portion 31a at step 122.

Figure 9E:
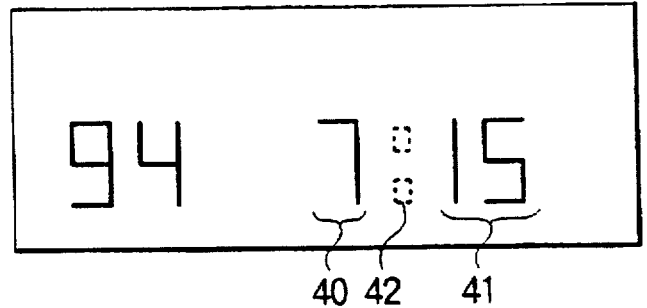

In FIG. 6, first, the display control portion 36 sends a control signal to the liquid crystal display 17 so as to switch off the data concerning the focal length, displayed on the liquid crystal display 17 (step 160). Next, the display control portion 36 sends a control signal to the liquid crystal display 17 so as to switch off the "LATCH" mark and the "m" mark displayed on the liquid crystal display 17 (step 161). Further, the "autofocus mode" is set in the mode setting portion 31a (step 162), and the display control portion 36 sends a control signal to the liquid crystal display 17 so as to light to display a numeral sequence indicating the data concerning the time counted by the clock circuit 34, on the liquid crystal display 17 (step 163). Based on these control signals, the image as shown in FIG. 9E is displayed on the liquid crystal display 17. Then the control unit waits until the mode switch 18 is turned off, and then returns the processing to step 102 when the mode switch 18 is turned off.

Figure 7:
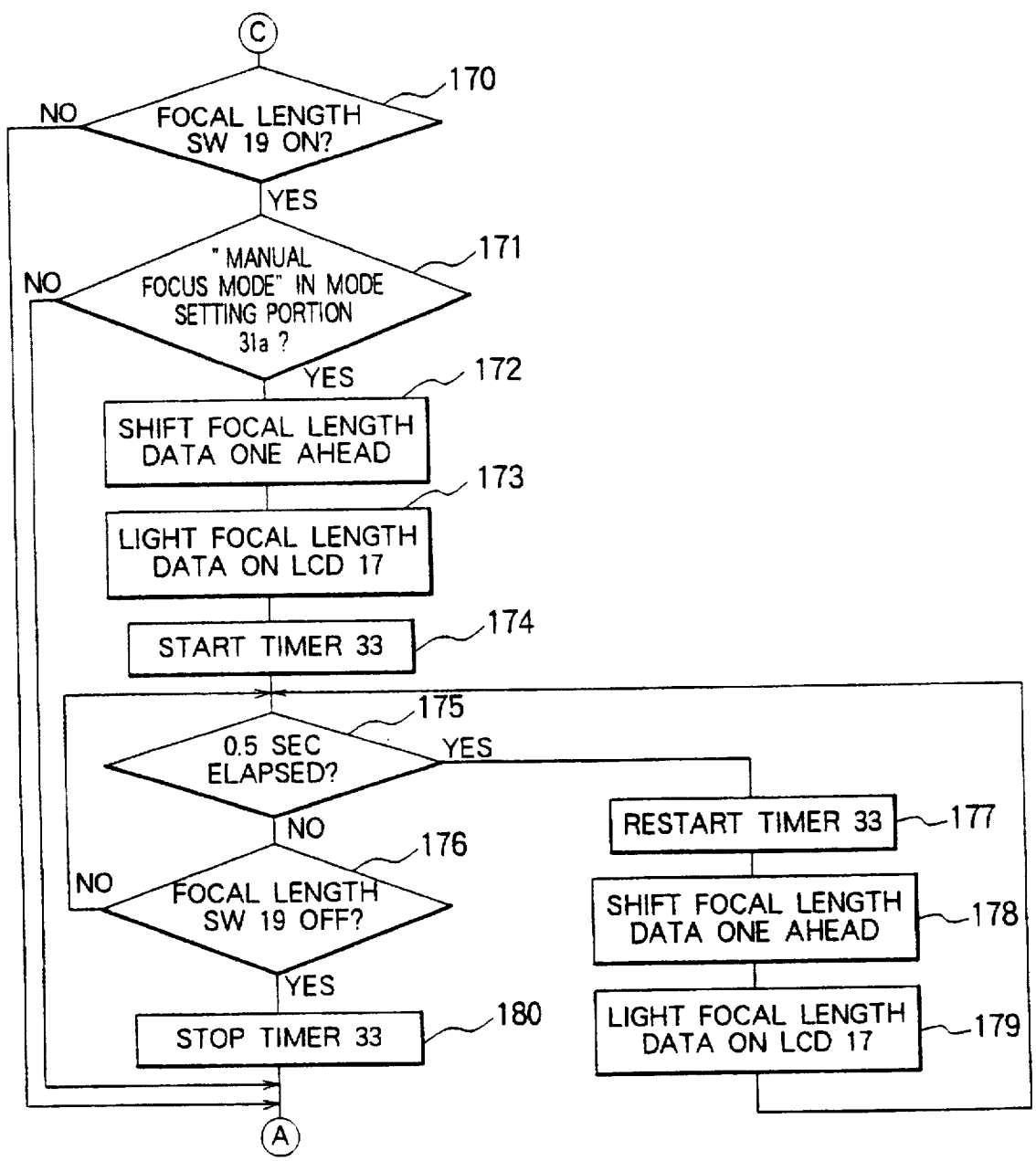
FIG. 7 is a flowchart to show the details of the example of processing by the control unit according to the present invention.

Next explained with FIG. 7 is the processing executed when the focal length switch 19 is pressed at step 108.

In FIG. 7, first, whether the focal length switch 19 is on is checked (step 170). If the focal length switch 19 is on, it is checked whether the "manual focus mode" is set in the mode setting portion 31a (step 171). If the "manual focus mode" is set in the mode setting portion 31a, the next focal length data is read out of the focal length storing portion 32 (step 172). Further, the display control portion 36 sends a control signal to the liquid crystal display 17 so as to light to display the focal length data thus read out, in the central portion of the liquid crystal display 17 (step 173), and the timer 33 is started (step 174).

While the focal length data is indicated on the liquid crystal display 17, it is checked with the timer 33 whether the predetermined time (for example, a half second) has elapsed after the focal length switch 19 was pressed (steps 175, 176). If the focal length switch 19 is still on at a lapse of the predetermined time, the timer 33 is restarted (step 177). Subsequently, the further next focal length data is read out of the focal length storing portion 32 (step 178), and the display control portion 36 sends a control signal to the liquid crystal display 17 so as to light to display the focal length data in the central portion of the liquid crystal display 17, and then the processing is returned to step 175.

If the focal length switch 19 is turned off before the predetermined time (for example, a half second) has elapsed after the focal length switch 19 was pressed (step 176), the timer 33 is stopped (step 180). The processing is also returned to step 102 if the focal length switch 19 is off at step 170, if the "manual focus mode" is not set in the mode setting portion 31a at step 171, and if the processing of step 180 is finished.

While the user continues pressing the focal length switch 19, the loop processing of steps 175 to 180 reads the focal length data at predetermined time intervals (for example, of a half second) from the smallest reading rank out of the plurality of focal length data (0.3 m, 0.4 m, 0.5 m, 0.6 m, ...) stored in the focal length storing portion 32. After the focal length data with the largest reading rank is read out, reading returns to the focal length data with the smallest reading rank, and is repeated up to the highest therefrom. Since the focal length data thus read out is displayed in order on the liquid crystal display 17, the user can readily select desired focal length data.

Further, as shown in FIG. 9C and FIG. 9E, indications of the focal length data on the liquid crystal display 17 are given using a segment 40 for indications of numerals indicating "month", a segment 41 for indications of numerals indicating "day", and a part (lower part) of a segment 42 for an indication of a colon disposed between the segments 40 and 41 in the display of the data concerning the time ("year-month-day" in the present embodiment). Since the liquid crystal display 17 employs the segment type display method as discussed above, it is preferred in respect of durability and cost reduction to decrease the number of segment electrodes by common use of the segments as much as possible for displaying two types of screens, for example the display of the data concerning the time and the display of the data concerning the focal length.

Thus, the present embodiment is arranged to have the segment 40 for display of numerals indicating "month" in the data concerning the time for common use to the segment 50 for display of numerals indicating integral parts in the focal length data. The embodiment also has the segment 41 for display of numerals indicating "day" in the data concerning the time for common use to the segment 51 for display of numerals indicating decimal parts in the focal length data. Further, the embodiment also has a part (lower segment) of the segment 42 for display of a colon (for example, in case of "day-hour-minute" being displayed as the data concerning the time as shown in FIG. 10, a colon is displayed between "hour" and "minute") disposed between the segments 40 and 41 for common use to the segment 52 for display of a decimal point in the focal length data.

The common use of the various segments enabled the at least two types of screens to be efficiently displayed on the liquid crystal display 17 without increasing the number of segments.

The present invention can be changed or modified in various forms without having to be limited to the above embodiment. For example, the present embodiment used the passive distance-measuring device 12, but the present invention does not have to be limited to this distance-measuring method, and can employ an active distance-measuring device. Further, the present embodiment used the liquid crystal display 17 as a display means, but another display device may be employed, for example ELD (electroluminescent display) or PD (plasma display).

Figure 10:
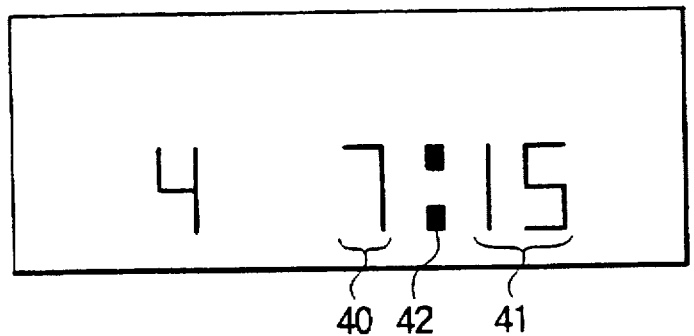
FIG. 10 is a drawing to show another example of screen display on the liquid crystal display according to the present invention.

In a preferred example, the apparatus is provided with a switch for alternately changing the data concerning the time displayed on the liquid crystal display 17 between the data of a date as shown in FIG. 8A–FIG. 8E and FIG. 9E (for example, "year-month-day") and the data of a real time as shown in FIG. 10 (for example, "day-hour-minute").

Further, the present embodiment used the focal length switch 19 of the push button type to read out the focal length data, but the switch may be of a dial type.

As detailed above, the present invention can provide a camera with an interface excellent in operability for user, which permits the user to select either the operation in which the mode change is performed every shot (one-shot return) or the operation in which a same mode is continuously maintained, by the period in which the mode switch is kept on (for example, by forcing it down).

Further, the present invention can provide a camera excellent in visual operability, which permits the user to visually check whether the focal length designated by the user is correctly accepted, because the focal length designated by the user is displayed on the display screen by the displaying means. Further, the camera of the present invention is arranged to display the data concerning the focal length in the display normally displaying the data concerning the time, thereby enabling to display the data concerning the focal length without using a separate display (segments).

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 247866/1994 (6-247866) filed on Oct. 13, 1994, and 247877/1994 (6-247877) filed on Oct. 13, 1994, are hereby incorporated by reference.

What is claimed is:

1. A camera comprising:
    focal length designating means switchable between an off state and an on state, said focal length designating means accepting designation of a focal length in the on state and outputting data concerning the focal length;
    a clock circuit for outputting data concerning time;
    a display for displaying the data concerning the focal length and the data concerning the time;
    focusing means for focusing in synchronization with a shutter release button; and
    display controlling means for displaying the data concerning the focal length on said display when said focal length designating means is in the on state and displaying the data concerning the time on said display when said focal length designating means is in the off state.

2. The camera according to claim 1, wherein said focal length designating means comprises
    a storing portion for storing a plurality of focal length data, and
    focal length data controlling means for successively outputting data concerning the focal length by successively reading the focal length data at predetermined time intervals out of the plurality of focal length data stored in said storing portion while said focal length designating means is in the on state, said focal length data controlling means accepting, as a focal length designated, focal length data read out when said focal length designating means is switched from the on state to the off state
    wherein, when said focal length designating means is in the on state, said display controlling means successively displays the data concerning the focal length output from said focal length designating means, on said display.

3. The camera according to claim 1, wherein said display comprises
    first and second segments for displaying respective numerals, and
    a third segment disposed between said first segment and said second segment, said third segment being provided for displaying a colon and a period wherein, when said focal length designating means is in the on state, said display controlling means displays the data concerning the focal length in said first, second, and third segments and wherein when said focal length designating means is in the off state, said display controlling means displays the data concerning the time in at least said first and second segments.

4. The camera according to claim 1, further comprising a switch for alternately switching the data concerning the time between a date and real time, wherein said display controlling means controls said display in such a manner that for displaying the
    data concerning the focal length, said first, second, and third segments display the data and said third segment displays a period,
    real time, said first and second segments display the data and said third segment displays a colon, and
    date, at least said first and second segments display the data.

5. The camera according to claim 1, further comprising:
    a mode setting portion in which is set either an autofocus mode in which said focusing means focuses according to a distance between the camera and an object, or a manual focus mode in which said focusing means achieves a focus at a focal length manually designated; and
    a mode switch switchable between an off state and an on state, said mode switch alternately switching a mode set in said mode setting portion between the autofocus mode and the manual focus mode for every activation of the on state, wherein said display controlling means controls said display to display the data concerning the focal length when the mode set is the manual focus mode, and to display the data concerning the time when the mode set is the autofocus mode.

6. The camera according to claim 5, wherein said display further comprises a segment for displaying a mark concerning the manual focus mode, and said display controlling means controls said display to display the mark concerning the manual focus mode when the mode set is the manual focus mode.

7. The camera according to claim 1, further comprising:
    a mode setting portion in which is set one of: an autofocus mode in which said focusing means focuses according to a distance between the camera and an object; a fixed focus mode in which said focusing means focuses to achieve a focus at a specific focal length; and a manual focus mode in which said focusing means focuses to achieve focus at a focal length manually designated; and
    a mode switch switchable between an off state and an on state, said mode switch alternately switching a mode set in said mode setting portion among the autofocus mode, the fixed focus mode, and the manual focus mode upon every activation of the on state, wherein said display controlling means controls the display to display the data concerning the focal length when the mode set in said mode setting portion is the manual focus mode, and to display the data concerning the time when the mode set is the autofocus mode or the fixed focus mode.

8. The camera according to claim 7, wherein said display further comprises a segment for displaying a mark concerning the manual focus mode and a segment for displaying a mark concerning the fixed focus mode, and said display controlling means controls the display to display the mark concerning the manual focus mode when the mode set is the manual focus mode, and to display the mark concerning the fixed focus mode when the mode set is the fixed focus mode.

9. The camera according to claim 1, further comprising detecting means for detecting a period in which said mode switch is in the on state wherein said focusing mode controlling means controls, after completion of the focusing by said focusing means, switching of the mode set in said mode setting portion depending on the period detected by said detecting means, wherein said display further comprises a segment for displaying a mark concerning latching of the mode set in said mode setting portion, and said display controlling means controls the display to display the mark concerning latching depending on the period detected by said detecting means.

* * * * *

UNITED STATES PATENT AND TRADEMARK OFFICE
CERTIFICATE OF CORRECTION

PATENT NO. : 5,748,998
DATED : May 5, 1998
INVENTOR(S) : Ishiguro et al.

It is certified that error appears in the above-identified patent and that said Letters Patent is hereby corrected as shown below:

Title page, item [73], change "Saitana-ken" to --Saitama-ken--.

Signed and Sealed this

Twenty-fourth Day of November, 1998

Attest:

BRUCE LEHMAN

Attesting Officer

Commissioner of Patents and Trademarks